Patented Apr. 18, 1950

2,504,100

UNITED STATES PATENT OFFICE 2,504,100

PRODUCTION OF PHENOL ALDEHYDE RESINS

Charles J. Plank and Darwin E. Badertscher, Woodbury, N. J., assignors to Socony-Vacuum Oil Company, Incorporated, a corporation of New York No Drawing. Application September 19, 1947, Serial No. 775,158

10 Claims. (Cl. 260—51)

This invention has to do with the production of phenol-formaldehyde type resins.

Resins of the phenol-aldehyde type, that is, those obtained by the condensation of a phenol and an aldehyde, are well known to those familiar with the art. Numerous procedures have been proposed for the preparation of these resins and, in general, catalytic procedures have been more successful than the non-catalytic. Various acids, bases and salts have all been credited with the ability to facilitate the condensation of phenol and formaldehyde, and thereby produce resins of different degrees of color, toughness, stability, etc., as well as different degrees of solubility in acids, bases and solvents. Unless great care is exercised in their preparation, however, the resins of this type tend to be dark in color and relatively unstable to the action of light and air. The decolorization of a dark resin of this type, or the precautions necessary for the preparation of a light-colored resin, appreciably increases the cost of the resin.

This invention is predicated upon the discovery that the condensation of phenol with formaldehyde, and more broadly the condensation of a hydroxylated aromatic hydrocarbon with an aldehyde, is aided by boron trifluoride and complexes of boron trifluoride. The resins obtained by such a condensation are clear and light-colored, and as such are more desirable than those obtained with other condensation agents.

The condensation contemplated herein is adapted for resinification of hydroxyaromatic compounds with all saturated aliphatic and aromatic aldehydes, typical of which are formaldehyde, acetaldehyde, butylaldehyde, benzaldehyde, etc., in the presence of $BF_3$ or a $BF_3$ complex. Preference is given to the aliphatic aldehydes and particularly preferred herein is formaldehyde.

As aforesaid, hydroxylated aromatic hydrocarbons condense with the foregoing aldehydes in the presence of boron trifluoride or a complex of said fluoride. Mono- and poly-hydroxylated, mono- or polycyclic aromatic hydrocarbons are contemplated herein, representative of which are the following: phenol, cresols, p-tertiary butyl phenol, p-tertiary amyl phenol, resorcinol, alpha- and beta-naphthols, mono- and poly-hydroxy methyl naphthalenes, mono- and poly-hydroxy poly-methyl naphthalenes, etc. Phenol is particularly preferred of such compounds. It is to be understood, however, that hydroxylated- and hydrogenated-aromatic hydrocarbons, such as cyclohexanol, are also contemplated herein.

Boron trifluoride and complexes of said fluoride which are dissociated at the reaction temperature are, as aforesaid, the condensation agents contemplated by the present invention. Included among such complexes are the etherates represented by the general formula $ROR' \cdot BF_3$, wherein R and R' are the same or different organic radicals: examples of such etherates are those of dimethyl ether, diethyl ether, methyl amyl ether, methyl phenyl ether, ethyl phenyl ether, etc. Complexes of acid halides and $BF_3$ are also contemplated, such complexes being represented by the general formula $RCOX \cdot BF_3$, wherein R is an organic radical and X is a halogen atom; typical of such complexes is acetyl-chloride $BF_3$. The ester $\cdot BF_3$ complexes comprise still another group, being represented by $RCOOR' \cdot BF_3$, wherein R and R' are the same or different organic radicals, as typified by methyl formate $\cdot BF_3$, ethyl formate $\cdot BF_3$, methyl acetate $\cdot BF_3$, ethyl acetate $\cdot BF_3$, methyl benzoate $\cdot BF_3$ and $HOCH_2COOCH_3 \cdot BF_3$. Representative of the nitrogen-containing compounds which form complexes with boron trifluoride and which may be employed are complexes such as are formed with the aromatic amines aniline, toluidine, etc. However, it is preferred to employ complexes of $BF_3$ and primary amines rather than complexes of $BF_3$ and secondary amines such as diethyl amine or $BF_3$ and tertiary amines such as pyridine. Contemplated also are complexes of the type $(RO \cdot BF_3)^- H^+$, wherein R is an organic radical, such being obtained by reacting alcohols, as methyl and ethyl alcohols, with $BF_3$.

Of the foregoing condensation agents, however, boron fluoride and its diethyl etherate $(H_5C_2OC_2H_5 \cdot BF_3)$ are particularly preferred.

The process contemplated herein for the production of phenol-formaldehyde type resins involves the following: phenol and formaldehyde, for example, are allowed to react in the presence of gaseous boron trifluoride or a boron trifluoride complex, which is in the liquid state. Formaldehyde may be used in the gaseous phase, aqueous solution or solid phase. The amount of boron trifluoride used may be varied considerably; however, from about 0.01 per cent to about 10 per cent by weight of the reactants is preferred. Similarly, the amount of boron trifluoride complex, such as an etherate, may be varied considerably, preferred amounts being from about 0.02 per cent to about 20 per cent by weight of the reactants. The reaction or condensation is preferably carried out at temperatures from about 0° C. to about 100° C., particularly from about 40° C. to about 100° C.; however, initial temperatures below about 0° C. may also be used as may temperatures up to the boiling point of phenol (182° C.). In general, it is preferred to use a temperature high enough to insure a liquid solution of the reactants, yet low enough to obviate an instantaneous reaction attended by the evolution of an excessive amount of heat. This will be explained in more detail by the typical examples shown hereinafter. It is beneficial to stir the reaction mixture during the course of the reaction or condensation. The reaction or condensation product is usually water-washed in order to remove the catalyst and any water-soluble products formed in the reaction. If the quantity of catalyst is not large, however, the water-washing operation may be omitted; in which case a lower temperature can be used during the setting operation, in view of the catalyst present in the product. It is to be noted that while white or colorless thermosetting resins are produced when phenol and formaldehyde are the reactants, the resins obtained when using other reactants, although colored, are of such light color that the resins can be readily pigmented to provide thermoset resins in pastel shades. Thus, it is now possible economically to produce phenol-formaldehyde type resins from which thermoset products in white to pastel shades can be produced. The process requires the use of only one catalyst and makes it possible to secure products having all the advantages of prior art phenol-formaldehyde type resins plus the additional advantage of light to white color.

Although the proportions of the reactants, aldehyde and hydroxylated hydroaromatic hydrocarbon, may be varied over a wide range in order to obtain resins with varying properties, it is preferred that a slightly larger molar quantity of aldehyde than said aromatic hydrocarbon be used. For example, to obtain a preferred phenol-formaldehyde resin, a ratio of about 7 moles of formaldehyde to about 6 moles of phenol is used.

The following examples serve to illustrate the new process and the resins obtained therewith.

*Example I*

A mixture of 100 grams of phenol and 100 grams of aqueous formaldehyde (37 per cent) were placed in a beaker and gaseous $BF_3$ was slowly bubbled into the reactants at about 30 ccs. per hour. After about 15 minutes, an exothermic reaction commenced and the water present therein began to boil. The reaction mixture was then divided into two portions. Portion (a) was allowed to stand without any further addition of $BF_3$, and it gradually cooled to room temperature whereupon a white, opaque, taffy-like material was obtained after 5 to 6 hours. Portion (b) was maintained at 100° C. with $BF_3$ passed therethrough for 30 minutes. A similar white, opaque, taffy-like substance was obtained in less than one hour.

The products obtained in (a) and (b) were combined and water-washed, being worked by hand under cold water. After so treating for 10–15 minutes, the product became considerably harder. The water-washed product was heated for about 20 minutes at 150° C., whereupon it melted. On cooling, it set to a hard, clear, light-colored, brittle resin.

*Example II*

A 100 gram portion of phenol was melted in a beaker and a slow stream of gaseous $BF_3$ was bubbled therethrough. With rapid mechanical agitation and continued addition of $BF_3$, 100 grams of formaldehyde solution (37 per cent) were added dropwise over a 30 minute interval. No sudden reaction or temperature change occurred, the average temperature being 50° C. and only at the $BF_3$ inlet jet did resinification take place. This reaction mixture was then divided into two portions. Portion (a) was placed in another beaker and brought to the boiling point of water, at which point the beaker was no longer heated. Reaction had started and so much heat was evolved that extremely vigorous boiling continued even after the beaker was no longer heated. A white, opaque, taffy-like product was formed in 10–15 minutes. This product was water-washed as described in Example I, and the product obtained after 30 minutes was an extremely hard, clear, light-colored resin.

Portion (b) was allowed to stand at room temperature (about 25° C.) with no further addition of $BF_3$. In 72 hours, a white, opaque, taffy-like product was formed.

*Example III*

A 100 gram portion of phenol was melted in a beaker and 37 grams of trioxymethylene were added thereto. The mixture was heated to 100° C. to dissolve the trioxymethylene, but complete solution was not obtained. However, a good suspension of the undissolved particles was obtained. The temperature was reduced to about 45° C. and gaseous $BF_3$ was injected into the mixture. Practically instantaneous reaction occurred, the mixture boiling vigorously. The jet, through which $BF_3$ was introduced, was removed and in less than 5 minutes about one-third of the reaction mixture had resinified to a white, opaque substance which was appreciably harder and more brittle than the initial products formed in Examples I and II. The resin had a sponge-like structure which may, perhaps, be explained by the instantaneous condensation when the catalyst came in contact with the phenol and formaldehyde molecules followed by the heat of solution fusing the strands together.

Within 2 hours the outer portions of the product were sufficiently hard and brittle to show a typical resinous fracture. The product melted to a clear, light-colored thermo-setting resin, as in Examples I and II.

*Example IV*

Twenty-five (25) grams of phenol were dissolved in the same weight of 37 per cent formaldehyde solution and 1 ml. of $(H_5C_2)_2O \cdot BF_3$ was added thereto. Apparently no immediate reaction took place, but the solution became cloudy after several minutes. After one hour, a definite white solid began to separate. On standing overnight, the white mass had coagulated to a white, taffy-like solid. The product was worked up mechanically, whereupon it became harder and lighter colored. After standing 48 hours at room temperature (about 25° C.), the product was quite brittle, the edge of a fracture exhibiting a glassy appearance.

*Example V*

About 15 mls. of $(H_5C_2)_2O \cdot BF_3$ were added to 15 mls. of aqueous, 37% formaldehyde solution saturated with phenol. A definite thickening of the reaction mixture took place within an hour and, on exposure overnight, the reaction mixture thickened considerably but was still not resinified. Another 15 grams of formaldehyde solution were added to react with any excess phenol that might be present. After 48 hours, a light-colored, rubber-like mass was obtained. When this mass was then heated to 100° C. for 20 minutes, further reaction occurred and, on cooling, a clear light-colored, hard, brittle resin was obtained.

Example VI

One (1) ml. of $(H_5C_2)_2O \cdot BF_3$ was added to 25 grams of phenol and 25 grams of 37% formaldehyde solution. No reaction was apparent for one hour and the reaction mixture was then heated to about 70° C., at which point heating was discontinued. After a minute or two, a vigorous exothermic reaction took place, the temperature being spontaneously increased to about 100° C. The greater portion of the product became solid at this time and the liquid portion was decanted. The solid portion was heated to 90° C. for several minutes and, on cooling, a clear, light-colored, hard, brittle resin was obtained.

To further illustrate the broad scope of the present invention various other hydroxy aromatic compounds were reacted with various other aldehydes in the presence of other boron trifluoride complexes under substantially the same reaction conditions as set forth hereinbefore. All of the resins so produced were thermosetting and either white in color or of such light color that they could be readily pigmented in the conventional manner to provide resinous masses in pastel shades.

| Ex. No. | Reaction Mixture | Color of Product | Time to Thermoset at 150° C. |
|---|---|---|---|
| VII | 100 g. phenol, 100 g. 36% aqueous formalin, 5 ml. of $BF_3$ etherate. | White | 3-5 min. |
| VIII | 100 g. phenol, 100 g. 36% aqueous formalin, 5 ml. of $BF_3$ methanol. | do | 5 min. |
| IX | 100 g. phenol, 100 g. 36% aqueous formalin, 5 g. of $BF_3$ aniline | light red | >30 min. |
| X | 100 g. p cresol, 100 g. 36% aqueous formalin, 5 ml. of $BF_3$ etherate. | light tan | >30 min. |
| XI | 100 g. p-cresol, 100 g. 36% aqueous formalin, 5 ml. of $BF_3$ methanol. | do | >30 min. |
| XII | 100 g. p-t. amylphenol, 100 g. 36% aqueous formalin, 5 ml. of $BF_3$ methanol. | yellow tacky | 4 min. |
| XIII | 100 g. o-cresol, 100 g. 36% aqueous formalin, 5 ml. of $BF_3$ methanol. | pale pink | >30 min. |
| XIV | 100 g. alpha-naphthol, 100 g. 36% aqueous formalin, 5 ml. of $BF_3$ methanol. | light red | <1 min. |
| XV | 100 g. resorcinol, 100 g. 36% aqueous formalin, 5 ml. of $BF_3$ etherate. | red brittle | already thermoset. |
| XVI | 25 g. resorcinol, 25 g. 36% aqueous formalin, 0.001 ml. of $BF_3$ etherate. | do | Do. |
| XVII | 25 g. phenol, 25 g. benzaldehyde, 2 ml. of $BF_3$ methanol | red tacky | >30 min. |
| XVIII | 94 g. phenol, 44 g. acetaldehyde, 5 ml. of $BF_3$ methanol | pinkish to tan | >5 min. |
| XIX | 25 g. phenol, 25 g. 36% aqueous formalin, 1.5 ml. of $BF_3$ acetic acid. | light gray | <1 min. |

It is to be noted that the present process provides another means for producing thermoset resins in a one-stage process. That is to say, the phenol and aldehyde are reacted in the mole ratio of about 1 mole of phenolic compound to about 0.88 to about 2 moles of aldehyde (as listed in the foregoing tabulation) in the presence of $BF_3$ either in the form of gaseous $BF_3$ or of a complex as defined hereinbefore and the reaction interrupted when the resin is in the "A" or "B" stage. Water is then removed from the reaction mixture by decantation and/or by heating the reaction mixture under a vacuum. The resin is then mixed with fillers and molded to obtain a thermoset molded product.

It is to be understood that the foregoing examples are illustrative only and that this invention is not limited thereto, rather the invention is to be broadly construed in the light of the language of the appended claims and as broadly as the prior art will permit. Thus, although the phenol and the aldehyde in the illustrative examples were reacted in a molor ratio of about 1 to 1.2, i. e. in the presence of a slight excess of aldehyde, it is to be understood that the molar ratio of hydroxylated aromatic compound to aldehyde can be varied within the limits of 1:2 to 2:1; or broadly, within those limits employed in the art heretofore.

The present application is a continuation-in-part of the application for United States Letters Patent Serial No. 505,966 filed October 12, 1943 in the names of Charles J. Plank and Darwin E. Badertscher and now abandoned.

We claim:

1. A process for preparing light colored to white thermosetting resins of the phenol-aldehyde type which comprises condensing only phenol and formaldehyde in the molar proportions of 6:7 in the presence of boron trifluoride at temperatures of 0° C. to 182° C., whereby a phenol-formaldehyde resin is obtained which after melting cools to a light colored to white thermosetting resin.

2. The process as described and set forth in claim 1 wherein condensation of said phenol and said formaldehyde takes place at temperatures of 0° C. to 100° C.

3. A process for preparing light colored to white thermo-setting resins of the phenol-aldehyde type in one step which comprises condensing in the presence of boron trifluoride at 0° C. to 182° C. only a phenolic compound selected from the group consisting of phenol, mono-cyclic phenol having only an alkyl group having not more than five carbon atoms attached to the nucleus in one of the ortho and para positions and unsubstituted hydroxylated polycyclic aromatic compounds having not more than two hydroxyl groups attached to the aromatic nucleus and an aldehyde selected from the group consisting of unsubstituted saturated aliphatic aldehydes and unsubstituted aromatic aldehydes in the ratio of 1 mole of phenolic compound to about 0.88 to about 2 moles of aldehyde.

4. A process for preparing light colored to white thermo-setting resins of the phenol-aldehyde type in one step, which comprises condensing in the presence of boron trifluoride at 0° C. to 182° C. only an unsubstituted polyhydric phenol and an aldehyde selected from the group consisting of unsubstituted saturated aliphatic aldehydes and unsubstituted aromatic aldehydes in the ratio of 1 mole of said polyhydric phenol to about 0.88 to about 2 moles of said aldehyde.

5. A process for preparing light colored to white thermo-setting resins of the phenol-aldehyde type in one step, which comprises condensing in the presence of boron trifluoride at 0° C. to 182° C. only an unsubstituted hydroxylated polycyclic aromatic compound having the hydroxyl group attached to the aromatic nucleus and an aldehyde selected from the group consisting of unsubstituted saturated aliphatic aldehydes and unsubstituted aromatic aldehydes in the ratio of 1 mole of said hydroxylated polycyclic aromatic compound to about 0.88 to about 2 moles of said aldehyde.

6. A process for preparing a thermo-setting resin in one step which comprises condensing in the presence of boron trifluoride at 0° C. to 182° C. only phenol and benzaldehyde in the ratio of 1 mole of phenol to about 0.88 mole of benzaldehyde.

7. A process for preparing a thermo-setting resin in one step which comprises condensing in the presence of boron trifluoride at 0° C. to 182° C. only phenol and formaldehyde in the molal ratio of 1: about 0.88 to about 2.

8. A process for preparing a thermo-setting resin in one step which comprises condensing in the presence of boron trifluoride at 0° C. to 182° C. only resorcinol and formaldehyde in the molal ratio of 1:1.32.

9. A process for preparing a thermo-setting resin in one step which comprises condensing in the presence of boron trifluoride at 0° C. to 182° C. only phenol and acetaldehyde in the molal ratio of 1.0.

10. A process for preparing a thermo-setting resin in one step which comprises condensing in the presence of boron trifluoride at 0° C. to 182° C. only alpha naphthol and formaldehyde in the molal ratio of 1:1.71.

CHARLES J. PLANK.
DARWIN E. BADERTSCHER.

REFERENCES CITED

The following references are of record in the file of this patent:

UNITED STATES PATENTS

| Number | Name | Date |
|---|---|---|
| 2,237,634 | Rosen | Apr. 8, 1941 |

FOREIGN PATENTS

| Number | Country | Date |
|---|---|---|
| 406,686 | France | Dec. 14, 1909 |
| 493,082 | Great Britain | Oct. 3, 1938 |